Dec. 31, 1929.   P. SHOLTES   1,742,103
GAUGE ATTACHMENT
Filed May 22, 1928
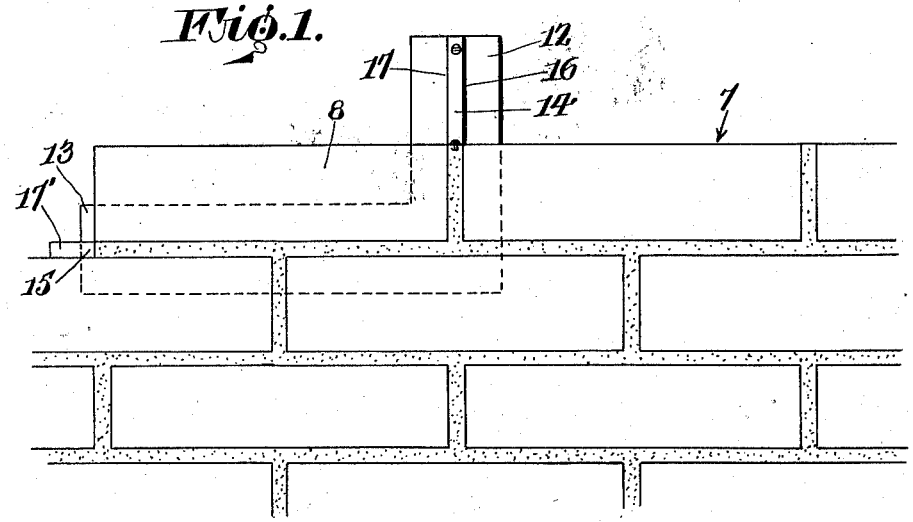
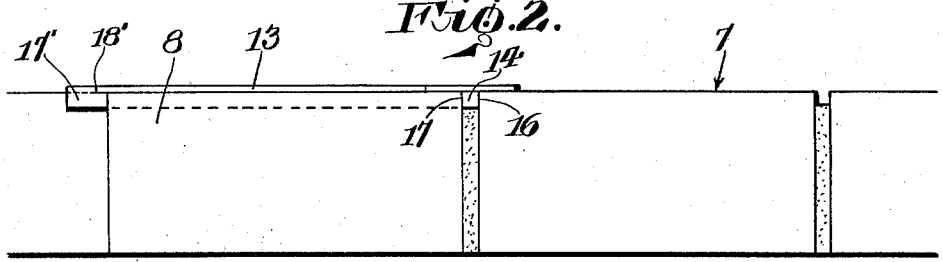
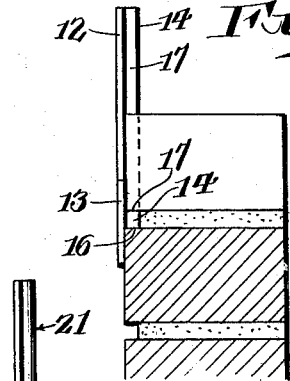
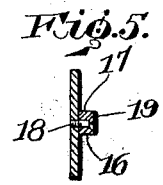
INVENTOR.
Peter Sholtes,
BY
Geo. P. Kimmel
ATTORNEY.

Patented Dec. 31, 1929

1,742,103

UNITED STATES PATENT OFFICE

PETER SHOLTES, OF YOUNGSTOWN, OHIO

GAUGE ATTACHMENT

Application filed May 22, 1928. Serial No. 279,809.

This invention relates to gauge attachments for squares employed by bricklayers, and the object of the invention is to provide, in a manner as hereinafter set forth, for gauging bricks in true uniplanular alignment and providing for a joint of uniform width with one application of the gauge.

Further objects of the invention are to provide in a manner as hereinafter set forth a gauge attachment for squares which is simple in its construction and arrangement, thoroughly efficient for its intended purpose, strong, durable, compact, convenient in its use, inexpensive to manufacture and requiring the minimum of storage space.

With the foregoing and other objects in view, the invention consists of the novel construction, combination and arrangement of parts as hereinafter more specifically described and illustrated in the accompanying drawings wherein is shown an embodiment of the invention, but it is to be understood that changes, variations and modifications may be resorted to which fall within the scope of the claims hereunto appended.

In the drawings wherein like reference characters denote corresponding parts throughout the several views:—

Figure 1 is a fragmentary view in elevation looking towards the inner face of a wall formed of a plurality of courses of bricks and showing the adaptation therewith of a gauge attachment in accordance with this invention.

Figure 2 is a top plan view of the wall showing the adaptation therewith of the gauge attachment.

Figure 3 is a cross-sectional view of a wall showing the adaptation therewith of the gauge attachment.

Figure 4 is a perspective view of a square with the gauge attachment secured to one face thereof.

Figure 5 is a section on line 5—5 of Figure 4.

Figure 6 is an end view of a modified form of the attachment in accordance with this invention.

Referring to the drawings in detail 7 indicates a wall formed of a series of courses of brick, and 8 designates a brick buttered with mortar or cement being positioned in the wall with the gauge attachment in accordance with this invention.

An L-shaped square of the type generally employed by bricklayers is indicated generally at 11 and consists of a right angular body portion formed of a pair of legs 12 and 13 one of which is of greater length than the other, the leg 12 being the shorter. The leg 13 extends from one end of leg 12 at right angles thereto and has its flat face in the same plane therewith.

The gauge attachment is of right angular contour and includes a pair of arms 14 and 15 connected at one end and disposed at right angles to each other. The gauge attachment is secured in a manner to be hereafter described to one of the uniplanular faces of the square and is disposed at the longitudinal median of each of the legs 12, 13 of the latter. The legs of the square are materially wider than the width of the arms of the attachment. The arm 14 corresponds in length with the leg 12. The arm 15 is considerably longer than the leg 13 and is formed with an extension 17' at the free end thereof, which provides a handle to manipulate the square. The extension 17' is of greater thickness than the remaining part of arm 15, and has one side thereof forming a continuation of the outer side of said remaining part and its other side extending in a plane parallel to and spaced from the plane of the inner side of said remaining part whereby the inner terminus of said extension provides a shoulder 18' which overlaps and abuts the free end of the leg 13 to form a reinforcement for the handle.

In cross section the attachment is the shape of a right parallelogram. The width between the opposed side faces 16, 17 may vary according to the thickness of the desired joint between the bricks. Moreover the side faces of the attachment project at true right angles with respect to the faces of the square. The outer face of the attachment is flat and also parallel to the face of the square.

The gauge attachment is detachably secured to the face of the square by means of suitable holdfast devices 18, the heads of which are countersunk in the outer face of the attchment as at 19. It is pointed out that the attachment may be formed integral with the face of the square similar to the modified convex form shown in Figure 6, and presently to be referred to.

Referring to Figure 6 wherein is shown the convex form of the gauge attachment, the body portion of the square designated generally at 20 is similar in every respect to the body portion of square 11. The gauge attachment designated generally at 21 is made integral with the face of the square. It is to be understood that the gauge attachment may be detachably secured to the face of the square in the same manner as illustrated in Figure 5 and described in the foregoing. In cross section the attachment 21 is substantially an inverted U-shaped contour having parallel side faces 22, 23 and a convex curved outer face 24.

In the application of the gauge attachment the flat face of the square is positioned on the outer side of the wall with the shorter leg 12 in vertical position. The brick 8 which has been previously buttered with the necessary mortar or cement is placed in its approximate position in alignment with the other courses of brick. The gauge arms 14, 15 are pressed into the soft mortar joint until the flat face of the square abuts the adjacent bricks as will be clearly understood by referring to Figures 1, 2 and 3 of the drawings. The brick being laid is then tapped lightly until it abuts the uniplanular face of the square and also abuts the side faces 17 or 22 of the gauge arms. Furthermore, care should be taken to see that the opposite side faces 16 or 23 are abutting against the adjacent bricks to insure a uniform width of joint throughout the wall. It will be seen from the foregoing that when the uniplanular face of the square is in abutting relation to the other courses of brick as well as the one being laid, then the outer surfaces of the bricks throughout the entire wall will necessarily be in the same plane. It is furthermore obvious that when the sides of the arms are in abutting relation to the adjacent bricks as well as the one being laid, there will be a uniformity in the width of the joint throughout the wall. The handle 17' is provided to be gripped in removing the gauge from its position of application.

What I claim is:—

1. In combination, an L-square, a pair of gauging arms disposed at right angles to each other and connected together at one end, each of said arms being positioned against one face of and at the longtiudinal median line of the leg of the square, one of said arms having its free end extended beyond the free end of one of the legs of the square and the other of said arms having its free end flush with the free end of the other leg of the square, and means for securing said arms to the legs of said square.

2. In combination, an L-square, a pair of gauging arms disposed at right angles to each other and connected together at one end, each of said arms being positioned against one face of and at the longitudinal median line of a leg of the square, one of said arms being of greater length than the other and projecting beyond and having a shoulder adjacent its free end abutting against the free end edge of that leg of the square with which it is associated, the other of said arms having its free end flush with the free end edge of that arm of the square with which it is associated, and means for securing said arms to said legs.

In testimony whereof, I affix my signature hereto.

PETER SHOLTES.